US009375110B2

(12) United States Patent
Norton et al.

(10) Patent No.: US 9,375,110 B2
(45) Date of Patent: Jun. 28, 2016

(54) UNIVERSAL COUPLING SYSTEM, METHOD AND APPARATUS FOR WINDOW COVERINGS

(75) Inventors: Grant Raymond Norton, Warranwood (AU); David Scott Wellington, Mt Waverley (AU)

(73) Assignee: Blindware Pty Ltd., Bayswater (AU)

( * ) Notice: Subject to any disclaimer, the term of this patent is extended or adjusted under 35 U.S.C. 154(b) by 0 days.

(21) Appl. No.: 14/235,459

(22) PCT Filed: Jul. 29, 2011

(86) PCT No.: PCT/AU2011/000955
§ 371 (c)(1), (2), (4) Date: Feb. 3, 2014

(87) PCT Pub. No.: WO2013/016752
PCT Pub. Date: Feb. 7, 2013

(65) Prior Publication Data
US 2014/0169714 A1 Jun. 19, 2014

(51) Int. Cl.

| | |
|---|---|
| ***F16C 23/04*** | (2006.01) |
| ***A47H 1/13*** | (2006.01) |
| ***E06B 9/50*** | (2006.01) |
| ***E06B 9/323*** | (2006.01) |
| *E06B 9/24* | (2006.01) |
| *E06B 9/174* | (2006.01) |

(52) U.S. Cl.
CPC *A47H 1/13* (2013.01); *E06B 9/323* (2013.01); *E06B 9/50* (2013.01); *E06B 2009/1746* (2013.01); *E06B 2009/2423* (2013.01)

(58) Field of Classification Search
CPC .... F16C 23/043; F16C 23/045; F16C 23/046; F16C 35/063; F16C 35/0635
USPC .................................. 384/192, 205, 206, 537
See application file for complete search history.

(56) References Cited

U.S. PATENT DOCUMENTS

| | | | | |
|---|---|---|---|---|
| 3,405,982 | A * | 10/1968 | Krenn | 384/537 |
| 3,949,919 | A * | 4/1976 | Takei | 226/194 |
| 4,413,665 | A | 11/1983 | Corcoran | |
| 2001/0037924 | A1 | 11/2001 | Montanana | |
| 2008/0067278 | A1 | 3/2008 | Fortunato et al. | |

FOREIGN PATENT DOCUMENTS

| | | | |
|---|---|---|---|
| GB | 191006417 | A | 0/1910 |
| GB | 1459053 | A | 12/1976 |
| GB | 1549118 | A | 7/1979 |

* cited by examiner

*Primary Examiner* — Phillip A Johnson
(74) *Attorney, Agent, or Firm* — Sutherland Asbill & Brennan LLP

(57) ABSTRACT

The invention relates to coupling at least two window coverings and, provides apparatus for coupling a first and second window covering in substantially coaxial alignment comprising the combination of a bracket and a bearing insert, where: the bracket comprises at least one first portion adapted for fixing the bracket to a structure and a second portion comprising a combination of one or more generally C-shaped apertures; the bearing insert comprises a generally annular assembly with first and second side portions secured together by a hub portion, the hub portion having an outer surface configured as a truncated circle, wherein the truncated circle configuration of the hub portion is adapted to allow passage of the bearing insert into the C-shaped aperture and prevent passage out of the C-shaped aperture upon rotation of the bearing insert in the C-shaped aperture.

4 Claims, 6 Drawing Sheets

UNIVERSAL COUPLING SYSTEM, METHOD AND APPARATUS FOR WINDOW COVERINGS

FIELD OF INVENTION

The present invention relates to the field of window coverings. In particular, the present invention relates to the coupling of two or more window coverings. In one form, the invention relates to a system suitable for linking roller type window coverings and it will be convenient to hereinafter describe the invention in relation to a bracket system for linking multiple roller type window coverings so that a single operating or driving device can operate two or more window coverings simultaneously, however it should be appreciated that the present invention is not limited to that use, only.

BACKGROUND ART

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

There have been attempts in the past to provide universal components for window covering systems. One example is described in International Patent publication No. WO 03/080978 in the name of RollEase, Inc. entitled "Universal Brackets for Roller Shade", in which an improved window treatment system is provided. The disclosed window covering system includes a head rail, a spring clutch disposed at one end of the head rail and an idler disposed at the other end of the head rail. A pair of universal brackets, being identical, for engagement with the head rail are used, one coupled to the spring clutch and the other coupled to the idler. Each bracket is suitable for fixedly mounting either the clutch or the idler at either end of the head rail by way of having slots in the body of the bracket for receiving the clutch and also having an opening disposed relative to the slots in the body of the bracket for receiving the idler. However, as is evident from the disclosure, the system of WO 03/080978 is applicable as an interchangeable bracket to the clutch and idler components of a window covering system, only.

When installing window blinds and coverings, there are a wide range of bracket types that may be used for the purposes of mounting the blinds in place, such as single brackets having multiple projections, double brackets having multiple projections and configurations, plus brackets used in different fascia systems, including double fascia systems.

Moreover, the concept of linking blinds is known and examples of link systems are disclosed in Australian patent No. 2009200489 in the name of RollEase, Inc. entitled "Multi-Section Window Dressing with Coupling Clutch" and in Australian patent No. AU-B 2005297336 in the name of Darmorgold Pty Ltd, entitled "Connector for a Blind Assembly". In the marketplace, companies such as Acmeda have their own non-adjustable link systems that generally involve the fixing of a metal precision ball bearing into a steel or other bracket to support the end of the blinds to be linked. These bearings may be subject to misaligning the adjacent roller blinds being linked and generally require a complex new linking bracket system to be developed every time a new application is identified. RollEase, Inc. also have a simple 50 mm projection single linking bracket that works with their adjustable link unit, however the bracket also may be subject to misaligning and is not flexible for the future creation of new bracket systems, such as double and fascia brackets. In some cases, manufacturer's systems have required that two sets of brackets are mounted next to each other to create the flexibility of linked and independent control of multiple blinds.

Also, the company Vertilux Pty Ltd uses link brackets that incorporate C-shaped open ended design. However the insert for these brackets uses a precision metal bearing encapsulated into a plastic outer housing that is installed by pushing the assembly into the opening of the bracket and then turning by 90 degrees to lock the assembly into place. In this case, the locking clip is incorporated into the design of the outer housing by the use of an elongated tab that flexes away from the bracket when being fitted, then locks into the C-shaped opening at the end of the bracket after it is rotated by 90 degrees.

Another known system for linking shades and blinds is the RollEase™ link system developed and marketed by RollEase, Inc. which incorporates the 50 mm projection single linking bracket noted above. The above noted multi-section window dressing with coupling clutch disclosed in Australian patent No. 2009200489 forms part of the RollEase™ link system. When using the RollEase™ adjustable link unit, it has been noted that the providers of the RollEase™ system only manufactured and supplied one type of bracket to be used in conjunction with this unit, ie a 50 mm projection single bracket. This means that the RollEase™ adjustable link unit may not be used in conjunction with any other types of standard bracket installations. In general terms, it is considered by the inventor that proprietary systems for linked window coverings are restricted in their flexibility for use with standard or common window covering installation and support systems. Accordingly, in the inventor's view, there is a need for a means to allow proprietary linking systems for window coverings to be easily used in conjunction with a much wider range of support systems such as bracket installations.

Further, in a particular observation of the inventor, it is considered that it is not possible to integrate a combination of blinds on a single double bracket for supporting two roller type blinds where one set of blinds may be linked and the other set is able to be operated as an independent blind.

Furthermore, the existing bracket systems are not considered modular, which means that every time a new bracket system is required, there needs to be a significant investment in new engineering and manufacturing development to create the newly required link bracket systems. This creates resistance to invest in new bracket systems, severely limiting the applications where blinds could be linked using, for example, the RollEase™ adjustable link system.

As noted above, misalignment of blinds is a problem that is found in many related art systems. In contrast, self-alignment is a desirable and important feature and can provide several advantages. None of the systems in the market to date create a self-aligning capability. By way of example, the main disadvantage of using metal precision bearings found in many related art systems is that if the blinds or the brackets are slightly out of alignment, there can be large forces created that can cause failure of the fixing of the bearing into the bracket, causing the bearing to disengage from the bracket by overstressing the fixing method between the two components. Also, using this type of bearing creates a requirement for larger size due to the inherent size of this type of bearing unit. Also, using metal precision bearings is very inflexible in regard to the inner diameter size and the ability to match to certain shaft or mandrel sizes and the minimum dimensions of components that must pass through the bearing inner diameter.

It is considered that a more modular system is required, where there can be a simple bracket design that could be quickly developed and manufactured and which desirably used other modular components or inserts that may provide self-aligning bearing functions.

SUMMARY OF INVENTION

It is an object of the embodiments described herein to overcome or alleviate at least one of the above noted drawbacks of related art systems or to at least provide a useful alternative to related art systems.

A further object of the present invention is to provide a universal and flexible bracket system for use with either adjustable or fixed linking systems for window coverings.

In a first aspect of embodiments described herein there is provided apparatus for coupling a first and second window covering in substantially coaxial alignment comprising the combination of a bracket and a bearing insert, where:

the bracket comprises at least one first portion adapted for fixing the bracket to a structure and a second portion comprising a combination of one or more generally C-shaped apertures;

the bearing insert comprises a generally annular assembly with first and second side portions secured together by a hub portion, the hub portion having an outer surface configured as a truncated circle, wherein the truncated circle configuration of the hub portion is adapted to allow passage of the bearing insert into the C-shaped aperture and prevent passage out of the C-shaped aperture upon rotation of the bearing insert in the C-shaped aperture.

Preferably, the above apparatus further comprises a locking clip for locking the bearing insert into the bracket by engaging with the bearing insert proximate the opening of the bracket. The locking clip may be adapted for insertion into the bearing insert and may comprise one of:

a separate component;

an integral component of the bearing insert, or;

an integral component of the bracket.

In a preferred embodiment, the bearing insert comprises one or more apertures for engaging the locking clip or for receiving a lug of the locking clip.

Upon passage into the bracket the bearing insert may be supported within the C-shaped aperture, preferably within the inner circumference of the aperture.

It is further noted that the at least one first portion of the bracket is disposed at an angle to the second portion of the bracket, which facilitates attachment to walls and or ceilings etc. Each portion may in one embodiment be planar.

Most preferably, a centre of the annular assembly of the bearing insert is adapted for accommodating one of a bearing and an independent link. In this respect, preferred embodiments of the present invention find application in a multiple element window covering system, for example, a multiple element window covering system having a first set of window coverings and a second set of window coverings and one or a combination of:

each set having independently controlled lift mechanisms for each respective window covering;

the first set of window coverings controlled by a single lift mechanism and the second set of window coverings having independently controlled lift mechanisms for each respective window covering;

both first and second sets of window coverings controlled by a single lift mechanism.

In one particular form a multiple element window covering system may have a combination where a first set of linked window coverings is controlled by a single lift mechanism and a second set of window coverings is controlled independently with respect to the first set of window coverings by individual lift mechanisms operatively associated with each respective window covering of the second set, wherein the multiple element window covering system comprises the apparatus described herein in which the annular assembly of the bearing insert is adapted for accommodating one of a bearing and an independent link.

In another aspect of embodiments described herein there is provided a bearing assembly of a multiple element window covering system comprising:

a spherical bearing having an inner surface defining an aperture adapted for engaging a shaft of a window covering and an outer spherical section surface adapted to slidingly engage with a corresponding surface of a coaxial spherical section bushing to provide rotation of the bearing both longitudinally and transverse to the axis of the shaft for facilitating self alignment thereof.

Preferably, the inner surface of the spherical bearing is adapted to conform to the shape of the shaft so as to grip the shaft and provide a positive drive between the inner surface of the bearing and the shaft. In achieving this, the inner surface may comprise lugs for engaging the shaft or other mechanical means for engaging the shaft, as would be appreciated by the person skilled in the art. In preferred embodiments of the bearing assembly the bearing and bushing comprise one or a combination of:

polymer material, and;

metal.

In a particularly preferred embodiment, as described herein, apparatus for coupling a first and second window covering in substantially coaxial alignment as noted above comprises a bearing assembly as noted above.

In yet a further aspect of embodiments described herein there is provided a method of coupling a first and second window covering in substantial alignment, the method comprising the steps of:

engaging a drive shaft operatively connected to one or more of the first and second window coverings with a spherical bearing having an outer curved surface adapted to slidingly engage with a corresponding surface of a coaxial spherical in section bushing to provide angular rotation of the bearing about a central point of the bearing assembly in two orthogonal directions for facilitating self alignment of the shaft.

In the context of the present description, it is to be noted that where the term “window covering” or similar terms are used herein, a device, article or material is described that may be used in interior and exterior applications for screening a window for privacy, used to cover a window for protection from the elements, isolation from heat or cold, used to cover a window to manage sunlight, to provide additional weatherproofing, to ensure privacy or for purely decorative purposes and may include blinds, drapes, shutters, shades, awnings, curtains or similar articles, unless the context otherwise requires, and should not be construed to limit the present invention to any particular covering, article or device.

Other aspects and preferred forms are disclosed in the specification and/or defined in the appended claims, forming a part of the description of the invention.

In essence, embodiments of the present invention stem from the realization that it is possible to use a modular (plastic) spherical bush bearing insert and/or modular independent link insert with a much wider range of link brackets that can be designed to incorporate a C-shaped opening. The main principle behind the realisation of the invention was the development and integration of a plastic spherical bush bearing, which incorporates a self-aligning feature. This allows the overall size of the coupling system to be small enough so that the brackets could be of similar size to the end brackets and ensured the shaft of common systems such as, for example, the RollEase™ multi-link unit could pass through the inner diameter of the bearing with minimum of excessive clearances and also in such a way that the shaft can be mechanically gripped by the inner cone of the bearing insert to ensure the rotation movement is always performed by the bearing and not between the shaft and the inner bearing cone.

Advantages provided by the present invention comprise the following:

- The design allows for rapid development of new link bracket types;
- The bracket design is now modular and allows easy integration with both a self-aligning bearing insert for linked blinds and also with a second insert that allows integration of independently controlled blinds;
- The bearing insert is self-aligning;
- The system is more compact and creates lesser light gap between blinds than some other link bracket systems;
- If required, the system can create a positive drive method between the inner bearing cone and the drive shaft of the adjustable link unit, so ensuring the rotation and operating forces are being fully transferred to the bearing insert and the rotation is not between the shaft and the inner diameter of the bearing insert.

The new bracket and insert system of preferred embodiments has several differences from existing systems. 1. It incorporates the self-aligning feature, so allows for some out of alignment between the adjustable link and the support brackets without creating large forces that can lead to system damage. 2. The brackets are now modular in their design and easy to design and fabricate. 3. The size is very compact, so the brackets can be kept small and consistent in size with the end brackets that support to other ends of the linked blinds. 4. The present design allows double blind combinations to be created where one set of blinds operates as a linked set using just a single chain operated lift mechanism or electric motor and the second set can be operated independently.

The preferred features of the present invention allows the components to be produced at reasonable cost and in such a way that a window covering product may have good aesthetic appeal. It is reliable, smooth in its operation, quiet and very easy to install and has lesser light gap between the blinds compared with some other systems.

The system of preferred embodiments has very good aesthetic appeal, can be very competitively priced, incorporates the self-aligning features and is more compact. Furthermore, it is cheaper to produce and more flexible, especially to quickly develop new link bracket designs almost immediately after any new brackets are released by manufacturers. The preferred bearing unit uses a spherical plastic bush bearing design, which is more flexible to manufacture and also provides advantages of smaller size, quietness and smoothness.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1:
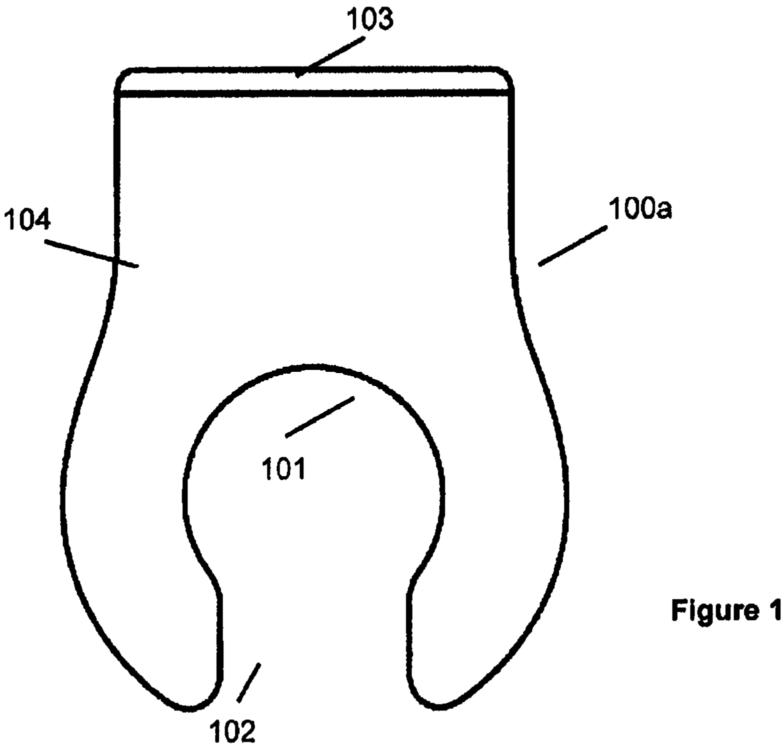
FIG. 1 is a plan view that illustrates an example bracket in accordance with a preferred embodiment of the present invention.
Figure 2:
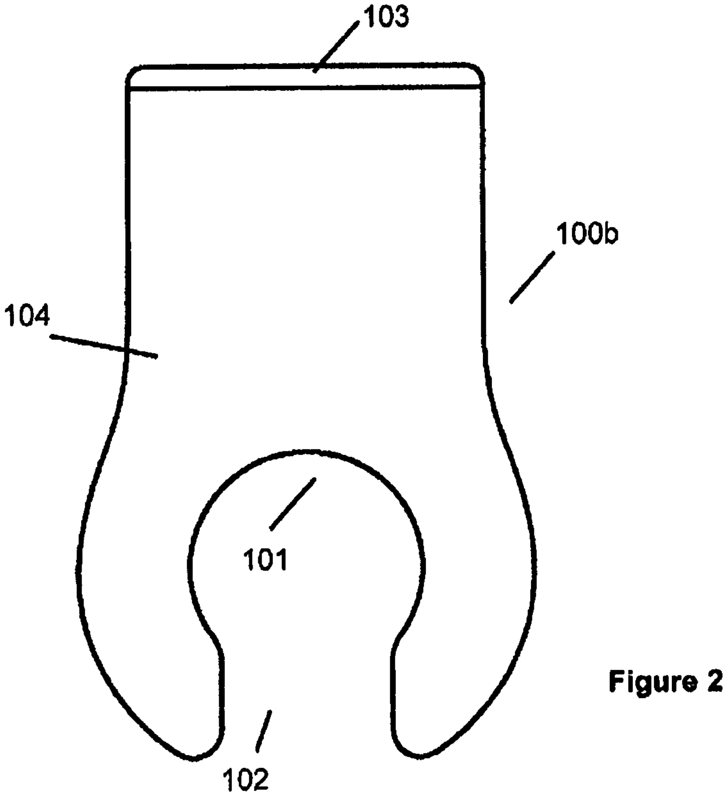
FIG. 2 is a plan view illustrating another example bracket in accordance with a preferred embodiment of the present invention.
Figure 3:
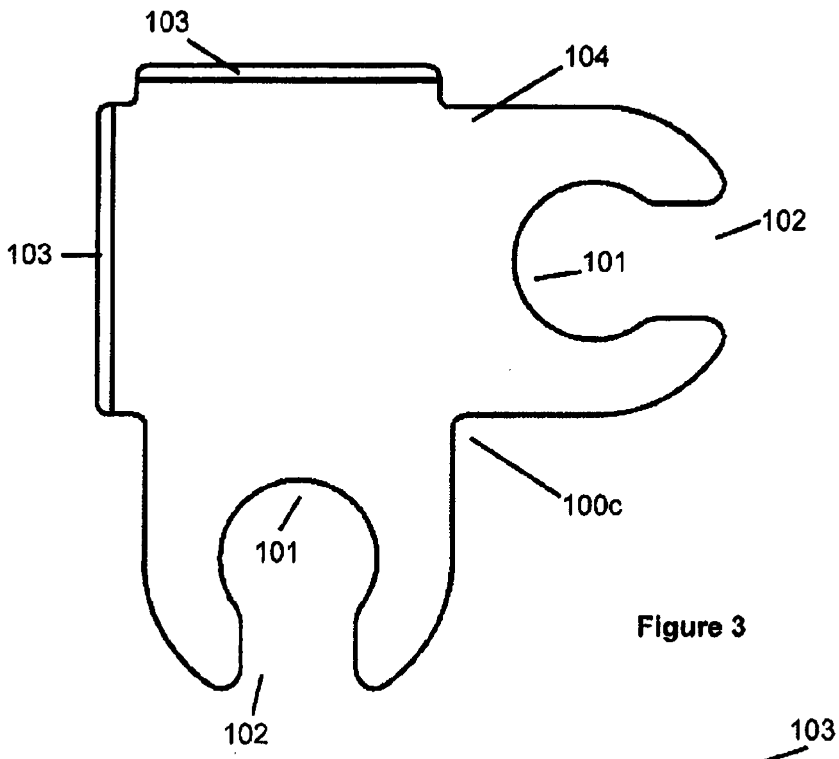
FIG. 3 is another plan view that illustrates another example bracket in accordance with a preferred embodiment of the present invention.
Figure 4:
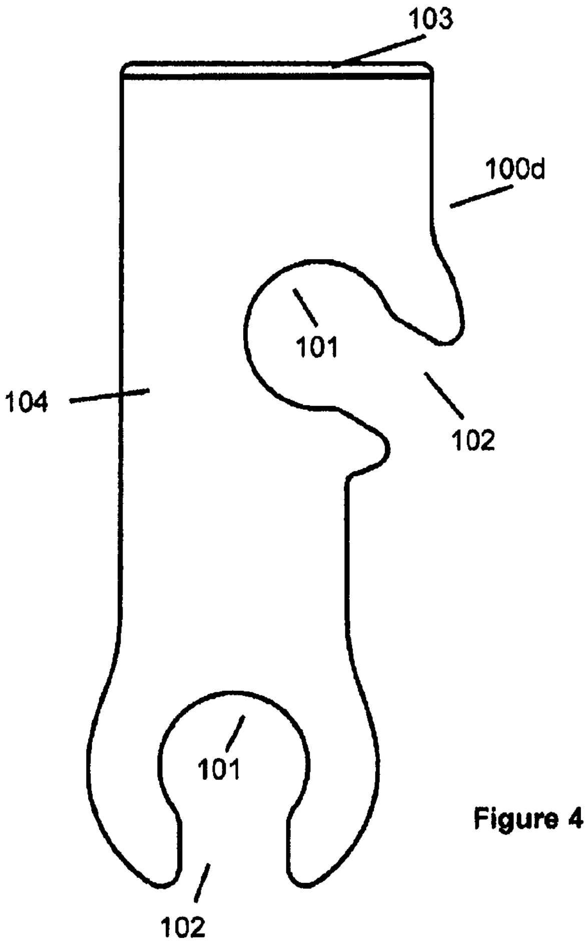
FIG. 4 is yet another plan view that illustrates a further example bracket in accordance with a preferred embodiment of the present invention.

In accordance with embodiments disclosed herein, essentially the present invention provides a new type of modular bracket and bearing system that has been designed to be much more flexible and also provides a self-alignment feature. Reference is made to the accompanying drawings as follows.

A preferred system comprises two elements:

1. A modular bracket design (exemplified in FIGS. 1 to 4 denoted as 100*a* to 100*d*, respectively) to hold the modular bearing unit or insert (denoted in FIGS. 5 to 14 as 200*a* to 200*f*).

2. A self-aligning bearing insert (exemplified as 300*a* to 300*c* in FIGS. 5 to 8) and also an independent link insert (exemplified as 200*d* to 200*e* in FIGS. 10 and 12, respectively). That is, two components, optionally.

In a preferred embodiment, there is an apparatus for coupling a first and second window covering in substantially coaxial alignment comprising the combination of a bracket and a bearing insert. FIGS. 1 to 4 show the bracket 100 and FIGS. 5 to 14 show the features of the bearing insert 200. The bracket 100 comprises at least one first planar portion 103 adapted for fixing the bracket 100 to a structure and a second planar portion 104 comprising a combination of one or more generally C-shaped apertures. The bearing insert 200 comprises an annular assembly with first and second side portions, 310 and 320, respectively as shown in FIGS. 6, 9, 11 and 14. The side portions 310 and 320 are secured together by an hub portion 330 having its outer circumference configured as a truncated circle 303. In forming a truncated circle, a preferred embodiment provides two 'flats', one on each side of the hub portion 330 for 90 degree rotation to allow locking into the C-shaped aperture upon rotation. The truncated circle configuration 303 of the hub portion 330 of the bearing insert 200 is adapted to conform to the opening 102 of the C-shaped aperture which allows passage of the bearing insert 200 into the C-shaped aperture and prevents passage out of the C-shaped aperture upon rotation of the bearing insert 200 in the plane of the C-shaped aperture.

Figure 15:
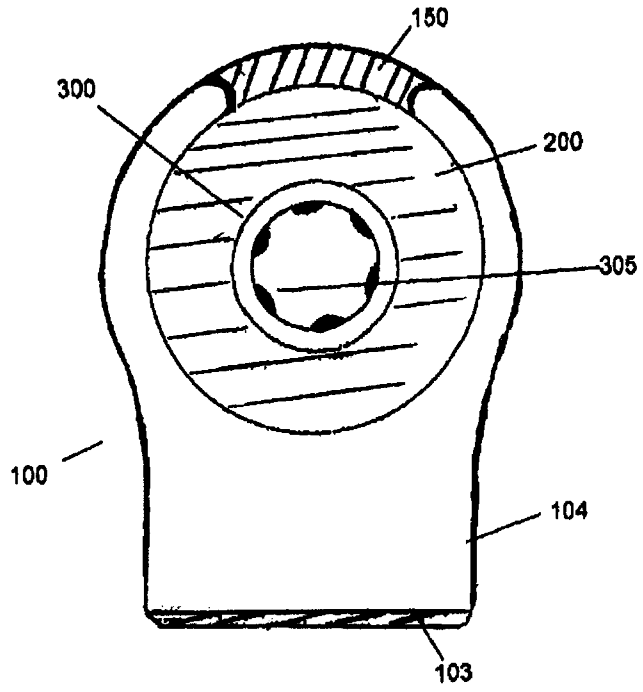
FIG. 15 is showing the axis of a window covering shaft into the plane of the page and illustrates a side view of an exemplary coupling including an assembled bracket and bearing insert with locking clip in accordance with a preferred embodiment.

Preferably, the above apparatus further comprises a locking clip 150 as shown in FIG. 15, for locking the bearing insert 200 into the C-shaped aperture of the bracket 100 by engaging with the bearing insert 200 at the open end 102 of the C-shaped aperture. The locking clip 150 may be adapted for insertion into the bearing insert 200 and may comprise one of:

a separate component;

an integral component of the bearing insert, or;

an integral component of the bracket.

In a preferred embodiment, the bearing insert 200 comprises apertures 304 for receiving the locking clip 150.

Upon passage into the C-shaped aperture the bearing insert 200 may be supported within the inner circumference 101 of the C-shaped aperture. It is further noted that the at least one first planar portion 103 of the bracket 100 is disposed at an angle to the second planar portion 104 of the bracket 100, which facilitates attachment to walls and or ceilings etc.

In one embodiment, a centre of the annular assembly of the bearing insert is adapted for accommodating one of a bearing 300 and an independent link 400. However, this is not necessarily the most preferred use for the product. This is simply one type of use for the bracket. Most common use is double linked or double independent. In this respect, preferred embodiments of the present invention find application in a multiple element window covering system having a double blind combination where a first set of linked window coverings is controlled by a single lift mechanism and a second set of window coverings is controlled independently with respect to the first set of window coverings by individual lift mechanisms operatively associated with each respective window covering of the second set, wherein the multiple element window covering system comprises the apparatus described herein in which the annular assembly of the bearing insert is adapted for accommodating one of a bearing and an independent link.

The design of a bracket 100 for a window covering system in accordance with a preferred embodiment is now standardized where a simple C-shape is all that is required to create the standardized mounting location for either the self-aligning bearing insert 300 or the independent link insert 400. This C-shape bracket 100 is very easy to design and also can be easily fabricated using simple press tools or even by laser cutting steel or other materials for product evaluation or low volume manufacture. The bearing unit 200 is entirely fabricated from plastic and includes the self-aligning feature, plus compact size and flexible inner and outer dimensions. The bearing 300 is a spherical bush bearing design. The bearing unit 200 is also quiet in its operation, low friction and designed to provide positive drive between the drive shaft (not shown) of the adjustable link unit and the inner cone of the bearing 300. The bearing insert 200 is inserted into the bracket 100 by sliding the bearing unit 200 into the open "C" shape opening of the bracket 100, then turning by 90 degrees so that the bearing insert 200 is fixed into position by the inner radius 101 of the C-shapes opening of the bracket profile and the rounded diameter 201 of the bearing unit 200. A separate or an integrated locking clip 150 is then inserted into the bearing insert 200 at the open end 102 of the C-shape to fix the insert 200 so that it cannot rotate and fall out of the bracket opening 102.

Figure 5:
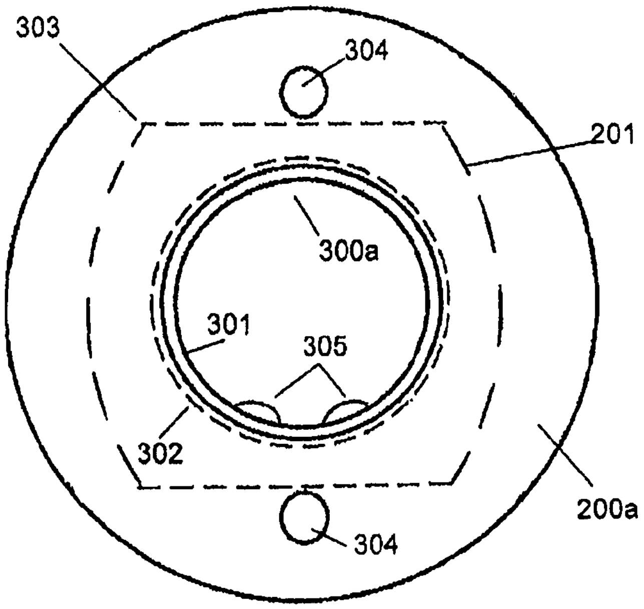
FIG. 5 is a side view that illustrates an exemplary bearing insert in accordance with a preferred embodiment of the present invention.
Figure 6:
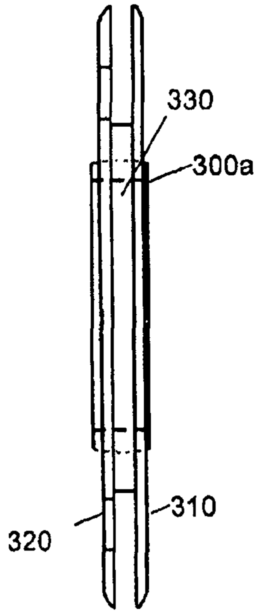
FIG. 6 is an end on view of the bearing insert of FIG. 5.
Figure 7:
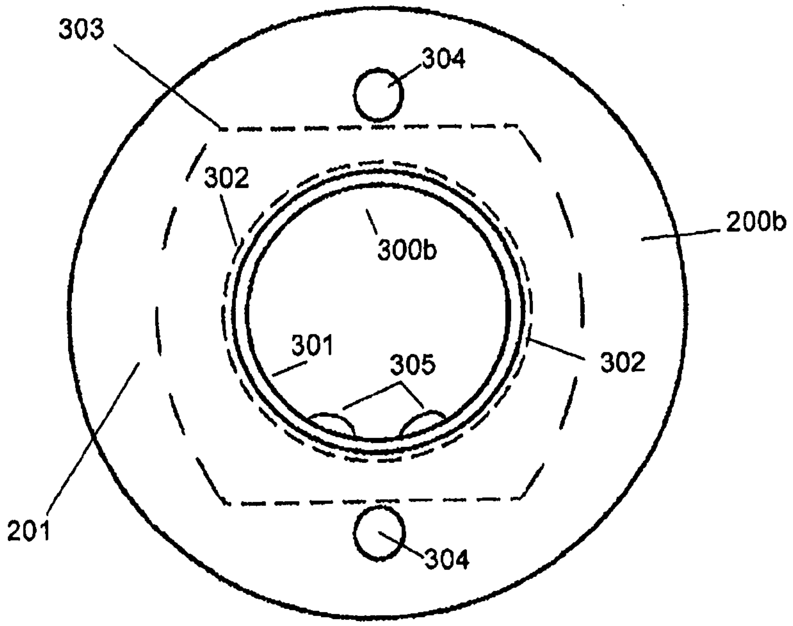
FIG. 7 is another side view of an exemplary bearing insert in accordance with a preferred embodiment of the present invention.
Figure 8:
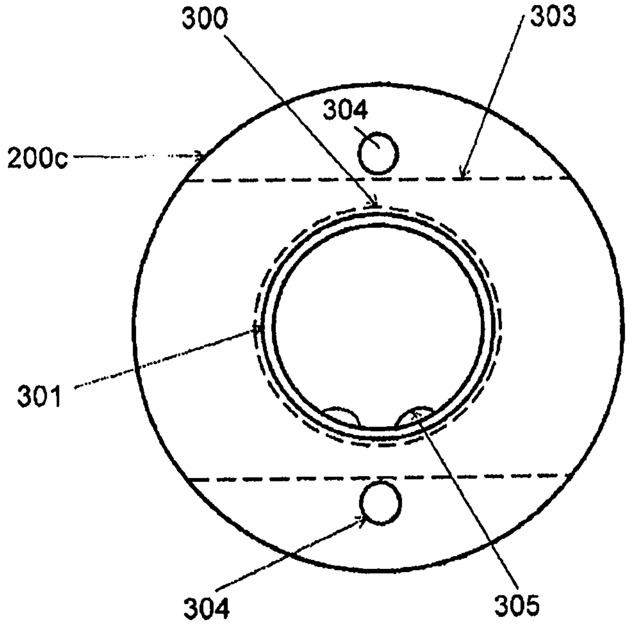
FIG. 8 is another side view of an exemplary bearing insert in accordance with a preferred embodiment of the present invention.
Figure 9:
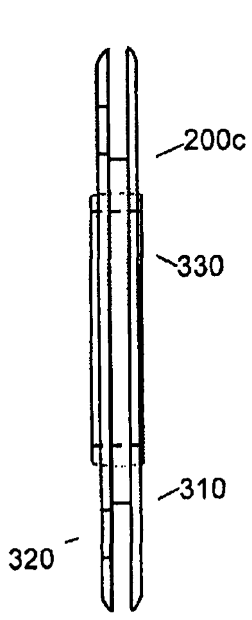
FIG. 9 is an end on view of the bearing insert shown in FIG. 8.
Figure 10:
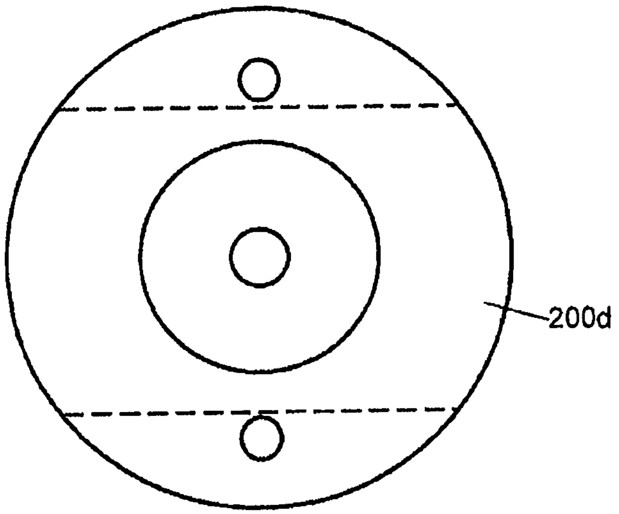
FIG. 10 is another side view of an exemplary bearing insert suitable for an idler end in accordance with a preferred embodiment of the present invention.
Figure 11:
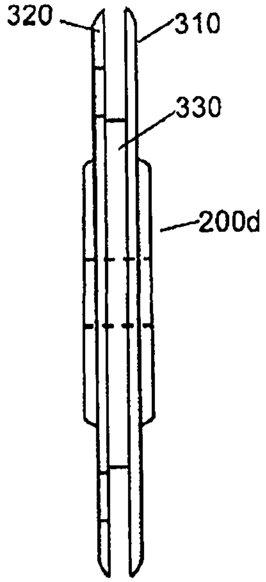
FIG. 11 is an end on view of the bearing insert shown in FIG. 10.
Figure 12:
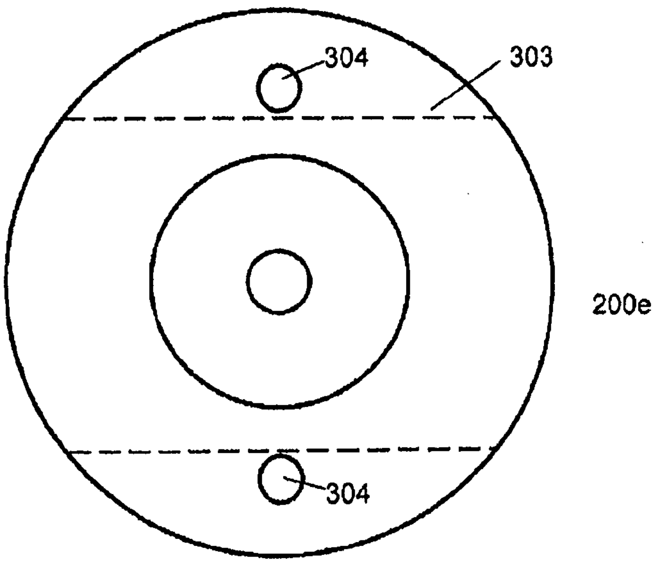
FIG. 12 is another side view of an exemplary bearing insert suitable for an idler end in accordance with a preferred embodiment of the present invention.
Figure 13:
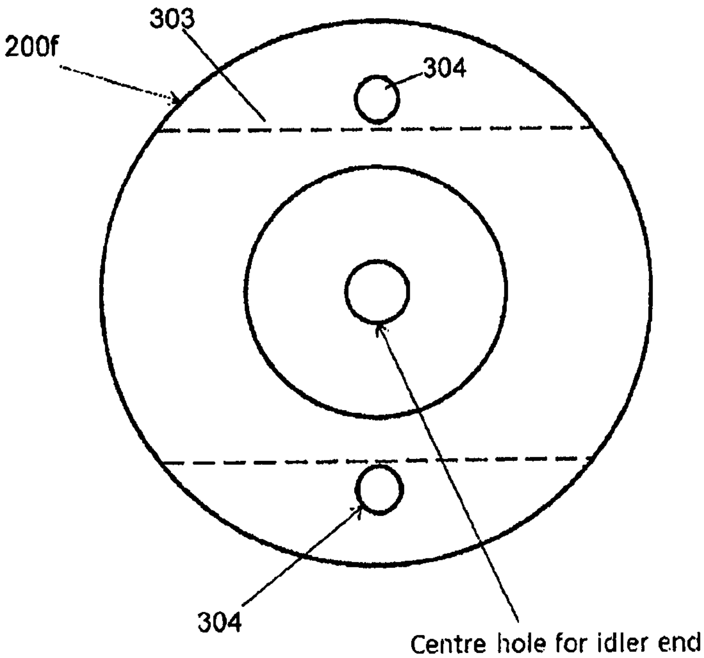
FIG. 13 is another side view of an exemplary bearing insert suitable for an idler end in accordance with a preferred embodiment of the present invention.
Figure 14:
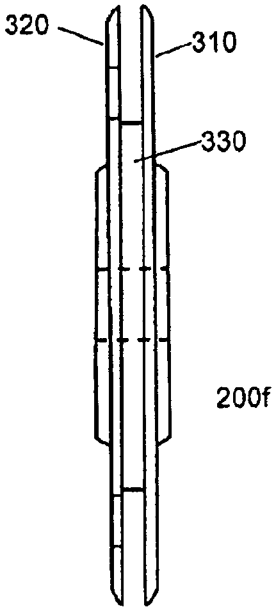
FIG. 14 is an end on view of the bearing insert shown in FIG. 13.

With respect to the bearing, as exemplified in FIGS. 5, 6 and 7 and partially in FIG. 15 there is provided a bearing assembly 300*a*-300*b* of a multiple element window covering system. The assembly of the bearing comprises a spherical bearing having an inner surface 301 defining an aperture adapted for engaging a shaft of a window covering and an outer curved surface adapted to slidingly engage with a corresponding surface of a coaxial spherical in section bushing to provide angular rotation of the bearing about a central point of the bearing assembly in two orthogonal directions for facilitating self alignment of the shaft. The bearing assembly provides angular rotation of the shaft in a range from about 0° to about 30°. The inner surface of the spherical bearing is adapted to conform to the shape of the shaft so as to grip the shaft and provide a positive drive between the inner surface of the bearing and the shaft. The inner surface may comprise lugs 305 for engaging the shaft. However, the inner surface of the spherical bearing may be adapted to present a smooth surface to the shaft. The bearing and bushing may comprise one or a combination of:

polymer material, and;

metal.

A method of coupling a first and second window covering in substantial alignment may be provided by the current arrangement where, the method comprises the steps of:

engaging a drive shaft operatively connected to one or more of the first and second window coverings with a spherical bearing having an outer curved surface adapted to slidingly engage with a corresponding surface of a coaxial spherical in section bushing to provide angular rotation of the bearing about a central point of the bearing assembly in two orthogonal directions for facilitating self alignment of the shaft.

The inner and outer bearing are somewhat locked together once assembled, which provides rotational movement anchored about the centre of the bearing assembly. The shaft, however, does have and retains longitudinal movement inside the inner cone of the bearing.

A preferred embodiment of the present invention is directed to the development of a universal bracket and retainer system for linking of multiple roller type window blinds within the Window Coverings industry, so that one operating device, such as a chain operated lifting mechanism or electric motor can operate two or more blinds simultaneously by creating a method of linking them together so they operate in unison.

A device in accordance with one embodiment has been designed to operate in conjunction with the RollEase™ multilink adjustable link system, however the device could operate with any type of adjustable or fixed linking system for window coverings. Therefore, in accordance with preferred embodiments, there is a modular system for creating linked blind assemblies using a single spherical bush bearing insert 300 or single independent link insert 200*d*, for example, in any combination of one or more inserts fitting into a range of brackets 100 that incorporate a C-shaped opening 102 that acts to support and retain the inserts 300, 200*d* in place.

As noted, the inner diameter of the bearing insert 200 can be engineered to any shape to match any type of drive shaft, including the inner bore of the bearing insert can be entirely smooth if required. Preferably lugs 305 are formed on the inner diameter for holding the shaft. The locking clip 150 can be a separate clip or can be integrated into the design of the outer housing of the bearing insert 200. The spherical bush bearing 300 can be made from plastic for smaller systems, however can also be made from metal or other materials for larger blind systems. The size of the bearing insert 200 can be varied (smaller or larger) as required to suit smaller or larger blinds.

In a trial conducted by the inventor, a preferred embodiment of the invention has successfully performed 30,000+ complete raise/lower cycles for a single 50 mm projection multi-linked blind combination that has been operated using an electric motor lifting system.

The use of a machined or moulded self-aligning spherical bush bearing which can be more compact and can be more flexible with the design of the inner 301 and outer 302 cone elements so that they can be more easily sized to suit the size of other system components such as drive shaft used as part of the link systems. Preferred embodiments have the ability to use the bearing insert 300 and/or the independent link insert 200*d* together for double blind combinations where one set of blinds can be controlled by a single chain operated lift device or electric motor while the second set of blinds can be operated independently by multiple chain operated lift devices or electric motors. Such an application may be where a glass door and window are next to each other and there is a double blind combination using a layer of blockout materials and a layer of sunscreen or view-through materials. The blockout blinds (2 or more) may be required to ALL raise and lower at the same time, while the sunscreen blind over the door may require its own independent control so it may be raised while the sunscreen blind in front of the window can remain lowered. Using conventional systems, this would be impossible to achieve using a single centre bracket.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

We claim:

1. A method of coupling a first and second window covering in substantial alignment, the method comprising the steps of:

engaging a drive shaft operatively connected to one or more of the first and second window coverings with a spherical bearing having an outer curved surface slidingly engageable with a corresponding surface of a coaxial spherical in section bushing to provide angular rotation of the bearing about a central point of the bearing in two orthogonal directions for facilitating self alignment of the shaft.

2. Apparatus for coupling a first and second window covering in substantially coaxial alignment comprising the combination of a bracket and a bearing insert, where:

the bracket comprises at least one first portion for fixing the bracket to a structure and a second portion comprising a combination of one or more generally C-shaped apertures; and the bearing insert comprises:

a generally annular assembly with first and second side portions secured together by a hub portion, the hub portion having an outer surface configured as a truncated circle, wherein the truncated circle configuration of the hub portion allows passage of the bearing insert into the C-shaped aperture and prevents passage out of the C-shaped aperture upon rotation of the bearing insert in the C-shaped aperture, and a spherical bearing having an inner surface defining an aperture for engaging a shaft of a window covering and an outer curved surface slidingly engageable with a corresponding surface of a coaxial spherical in section bushing to provide angular rotation of the bearing about a central point of the bearing in two orthogonal directions for facilitating self-alignment of the shaft.

3. Apparatus as claimed in claim 2, wherein the spherical bearing provides angular rotation of the shaft in a range from about zero degrees to about thirty degrees.

4. Apparatus as claimed in claim 2, wherein the spherical bearing and bushing comprise one or a combination of:

polymer material, and;

metal.

* * * * *